(12) United States Patent
Fernando (10) Patent No.: US 7,399,373 B2
(45) Date of Patent: Jul. 15, 2008

(54) SEAMING APPARATUS

(75) Inventor: Semage Rupasiri Fernando, Glenrothes (GB)

(73) Assignee: Ardmel Automation Limited, Glenrothes, Fife (GB)

( * ) Notice: Subject to any disclaimer, the term of this patent is extended or adjusted under 35 U.S.C. 154(b) by 191 days.

(21) Appl. No.: 10/562,979

(22) PCT Filed: Jun. 25, 2004

(86) PCT No.: PCT/GB2004/002730

§ 371 (c)(1),
(2), (4) Date: Dec. 28, 2005

(87) PCT Pub. No.: WO2005/003432

PCT Pub. Date: Jan. 13, 2005

(65) Prior Publication Data
US 2006/0151105 A1 Jul. 13, 2006

(30) Foreign Application Priority Data
Jun. 28, 2003 (GB) ................................. 0315178.4

(51) Int. Cl.
*B32B 37/00* (2006.01)
(52) U.S. Cl. ............. 156/73.1; 156/272.8; 156/290; 156/308.4; 156/379.6; 156/580.1
(58) Field of Classification Search ........... 156/73.1, 156/91, 92, 93, 272.8, 308.2, 308.4, 379.6, 156/379.8, 580.1, 580.2, 290; 112/217, 311, 112/320
See application file for complete search history.

(56) References Cited

U.S. PATENT DOCUMENTS

| | | | |
|---|---|---|---|
| 2,322,298 A | 6/1943 | Johnston | |
| 2,480,882 A | 9/1949 | Schmidt et al. | |
| 2,609,481 A | 9/1952 | Hacklander | |
| 3,808,080 A | 4/1974 | Parry | ............... 156/580 |
| 5,313,901 A * | 5/1994 | Fujii | ............... 112/320 |

FOREIGN PATENT DOCUMENTS

| | | |
|---|---|---|
| FR | 2255023 | 7/1975 |
| GB | 1044894 | 10/1966 |

* cited by examiner

*Primary Examiner*—James Sells
(74) *Attorney, Agent, or Firm*—Young Basile (57) ABSTRACT

The present invention relates to a seaming apparatus (10) for joining, along a seam without thread, two or more flexible sheets (12, 14). The apparatus comprises bonding means (16, 18) for bonding together at least two flexible sheet materials. The bonding means has a nip portion (36) for releasably engaging together sheet material, and drive means (20, 22) formed and arranged for engaging sheet material, and moving it incrementally through the bonding means. The drive means is formed and arranged to co-operate with the nip portion so as to sequentially nip then drive material through the apparatus wherein only one of the nip portion or the drive means is in contact with sheet material at any given moment. A method for joining flexible sheets by use of the apparatus of the invention is also described.

12 Claims, 14 Drawing Sheets

SEAMING APPARATUS

BACKGROUND OF THE INVENTION

The present invention relates to a seaming apparatus, in particular an ultrasonic or laser seaming apparatus for use in joining together two or more fabric or material components without thread. The apparatus is particularly suitable for seaming garments for example protective or weatherproof and other garments such as underwear, sportswear and the like comprising materials including thermoplastic sheets or textile materials made of or including substantially thermoplastic fibres, but not exclusively.

SUMMARY OF THE INVENTION

Seaming apparatus of this type are known also as ultrasonic sewing machines though, for the avoidance of doubt, no needle and thread are used for providing a seam. Ultrasonic sewing machines are generally well known and comprise an ultrasonic horn operable to emit ultrasonic energy through a fabric/material engaging end face and a rotatable anvil support. The anvil support and the horn are arranged so as to define a "nip" between the respective fabric engaging surfaces thereof for receiving the fabric sheet materials (or components e.g. zipper fasteners) to be joined. Such apparatus is generally well known in the art and is described variously in for example, U.S. Pat. No. 3,852,144; WO 02/49831A1; U.S. Pat. Nos. 3,785,910; 3,666,599; and others.

In such known apparatus fabric material is fed through the apparatus utilising the rotary motion of the aforesaid anvil (or feed) wheel but such arrangements have two fundamental disadvantages. Firstly it has been found that the bearings in such anvil wheels, being in close proximity to a very high frequency (ultrasonic) source are liable to rapid degradation and wear (including also complete bearing failure) which can result in considerable machine downtime and loss of productivity. The second particular problem associated with known apparatus is that the material to be joined is "nipped" between the anvil/anvil wheel and the resonating horn more or less substantially continuously and it will be understood that where material to be joined is being fed through such apparatus, and being "nipped" thereby, it is difficult for an operator to guide material through such a machine in such a way that significant changes in direction of the material, as it is passed through the apparatus, can be realised, or intricate seams made. Yet a further disadvantage of known systems is that the movement of the material through known apparatus can result in the material puckering resulting in seams which are uneven and/or not adequately weatherproofed, or at worst are unsightly and require the garment to be rejected as sub standard.

It is an object of the present invention to avoid or minimise one or more of the foregoing disadvantages.

The present invention provides a seaming apparatus for joining, along a seam without thread, at least two superposed flexible sheet materials, said seaming apparatus comprising bonding means for bonding together at least two flexible sheet materials, said bonding means having a nip portion for releasably engaging together sheet material in use of the apparatus; and drive means formed and arranged for engaging sheet material, in use and to be bonded, and moving incrementally sheet material through said bonding means, said drive means being formed and arranged to co-operate with said nip portion so as to sequentially nip then drive material through the apparatus wherein only one of said nip portion and said drive means is in contact with sheet material, in use of the apparatus, at any given moment.

Thus with a seaming apparatus according to the present invention it is possible to feed sheet material to be seamed together through a machine and by virtue of the discontinuous nature of the drive means engaging the sheet material it is possible, for the first time, to achieve sharp angle changes in direction in a seam and/or to form intricate seam patterns.

Preferably said bonding means comprises an ultrasonic horn structure and a welding foot (or anvil), said horn and said welding foot (or anvil) comprising said nip portion. Alternatively there may be used a laser for bonding together said at least two superposed flexible sheet materials. Desirably where there is used a laser to bond together the material a layer of dye or other energy (radiation) absorbing material may be deposited onto the material so as to focus the laser energy to where the bonding is required. Energy absorbing materials may also be utilised in ultrasonic bonding.)

An example of a process for laser welding using a radiation absorbing material is the patented process of The Welding Institute, Cambridge disclosed in International Patent Publication No. WO 00/20157 known as the CLEARWELD™ technique.

The nip portion of the apparatus may further comprise a holding foot and a throat plate, said holding foot and said throat plate being formed and arranged for releasably engaging sheet material in use of the apparatus. This arrangement provides additional means of securely holding the sheet material in place during the bonding operation.

Preferably there is provided a pin portion formed and arranged to pinch the sheet material and thereby to enable a material (garment) to be pivoted round for easy manoeuvring of the seam shape. The pin portion is desirably located in close proximity to the bonding means, preferably in alignment with the direction of feed and the bonding means. The pin portion may be conveniently attached to a moving foot of the drive means, or alternatively, can be independently mounted and actuated. The pin portion pinches the materials being joined, to hold them, at a time when they are not engaged by either the drive means or the bonding means, allowing the materials to be pivoted round to produce the desired seam shape or to correct the direction of the material through the apparatus. For some applications the pin of the pin portion may be pointed and can penetrate, or puncture, the materials to be bonded and thereby act as pivot point to facilitate the movement of material thereabout. For other applications, such as the production of water and windproof garments, it is desirable that the pin does not damage or puncture the sheet materials. In this case the pin has a contact surface at its tip that abuts and holds, but does not damage, the materials being joined when the pin portion pinches them. For example the contact surface at the tip of the pin may be a flat disc, or a hemisphere, having a sufficiently small surface area so as not to unduly impede pivoting of the pinched material therearound.

Preferably said bonding means is formed and arranged to provide a single discrete point of contact (bond) between said at least two superposed flexible sheet materials. In practice, and desirably, there may be provided a multiplicity of discrete points of contact between sheet materials where the thermoplastic constituents of such materials have fused and joined together. Advantageously said multiplicity of discrete joins or points of contact between flexible sheet materials provides a substantially continuous and weatherproof seam for an article or garment manufactured using said seaming apparatus. Alternatively the seam produced by said seaming apparatus can be considered to be a plurality of overlapping discrete welds or fusion points which have the appearance of a continuous seam.

Any suitable form of drive means may be used, which drive means releasably engages sheet material in use of the apparatus and for driving sheet material through said bonding means. The drive means may comprise a feed gear or gears or at least one feed dog formed and arranged to cooperate with at least one corresponding moving foot, between which flexible sheet material is engaged. Said feed dog is formed and arranged to incrementally move sheet material through the bonding means, then disengage the sheet material, return in an opposite direction to that in which it was engaging the sheet material and then re-engage a next portion of sheet material. Such a feed dog arrangement may be driven by a cam arrangement to produce the required cycle of motion. Stepper motors or the like may be used to drive said feed dog or said cam arrangement driving said feed dog. Preferably there are provided two moving feet co-operating with said feed dog.

Preferably said drive means is adjustable so as to vary the feed rate of the material through the seaming apparatus. Desirably the rate at which said nip portion of said bonding means "nips" is adjustable to correspond with any adjustments in the feed rate of the drive means, that is they are synchronised with one another. Desirably there is provided a controller means for co-ordinating operation of the drive means and the nip portion of the bonding means.

The points of contact, the contact faces, of the nip portion can be designed to impart various patterned appearances to the fabric, materials or components being joined.

The present invention also provides a method for joining, along a seam without thread, at least two superposed flexible sheet materials comprising the steps of;

a) providing a seaming apparatus according to the invention; and b) introducing said at least two flexible sheet materials into said seaming apparatus whereby the flexible sheet materials are sequentially, nipped by the nip portion of the apparatus whilst being bonded by the bonding means, then driven incrementally through the apparatus by the drive means, with only one of said nip portion and said drive means being in contact with the sheet material at any given moment.

DETAILED DESCRIPTION OF THE PREFERRED EMBODIMENT

A seaming apparatus, generally indicated by reference 10, is shown schematically in FIGS. 1a to d. The apparatus is for joining, along a seam without a thread, two sheets 12, 14 of fabric material containing thermoplastic fibres. The apparatus 10 comprises two essential features, that of a bonding assembly and that of a drive assembly for feeding sheet material through the apparatus. The arrow X indicates the direction of feed of the materials being bonded.

In more detail the bonding assembly comprises a welding foot 16 and an ultrasonic horn 18. In order to weld or to fuse together the two sheets of material 12, 14 the welding foot 16 is brought into contact with the static ultrasonic horn 18 and by applying high frequency vibratory (ultrasonic) energy into the fabric material containing thermoplastics, the two sheets of the material are fused and bonded together.

The drive assembly comprises two moveable feed dogs 20 (only one shown in the side view) mounted in proximity to the ultrasonic horn 18. The feed dog is provided with a driving arrangement (not shown) which causes the feed dog to move with respect to the ultrasonic horn as will be described further below. The feed dog co-operates with the moving foot 22 to grip between the moving foot 22 and the feed dog 20 the sheet material 12, 14, and to drive the sheet material through the seaming apparatus 10.

The operation of the drive assembly and the welding/bonding assembly will now be described in more detail.

Figure 1A:
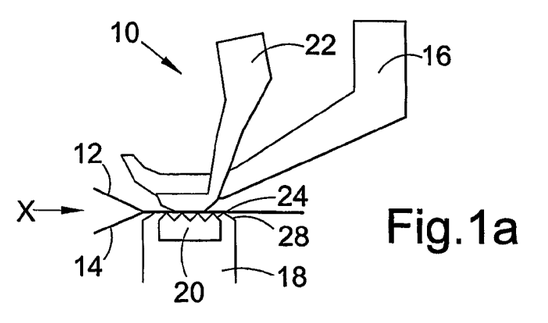
FIGS. 1a to d and FIGS. 2 and 3 show schematically the mode of operation of a seaming apparatus according to one embodiment of the present invention.

As show in FIG. 1a the two sheets of material 12, 14 to be bonded together are brought into contact with each other at the left hand side of the ultrasonic horn 18. FIG. 1a shows the first step of the feed cycle of the drive assembly and it will be noted that the moving foot 22 co-operates with the feed dog 20 so as to grip between the serrated surface 24 of the feed dog 20 and the underside 26 of the moving foot 22 the two sheets of material. In this position the welding foot 16 is spaced apart from the ultrasonic horn 18 in a retracted position (see also the schematic front view shown on FIG. 2).

Figure 1B:
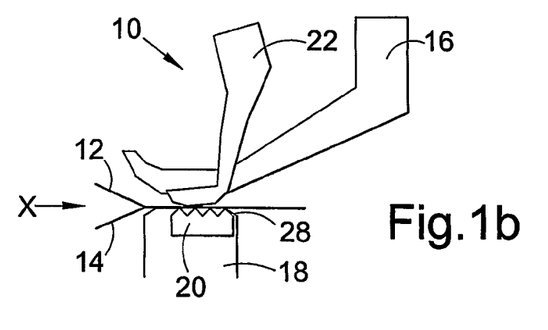

The feed dog 20 is driven laterally by a drive mechanism (not shown) from the left side of the ultrasonic horn 18 (as shown in FIG. 1a) to the right hand side of the ultrasonic horn 18 as shown in FIG. 1b. FIG. 1b shows the end of the feed cycle of the drive assembly which has fed the sheet material across the surface 28 of the ultrasonic horn 18.

Figure 1C:
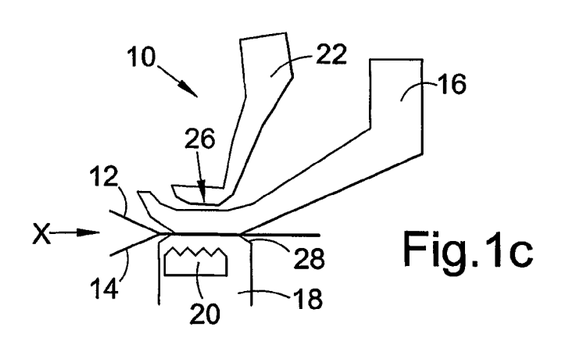
Figure 1D:
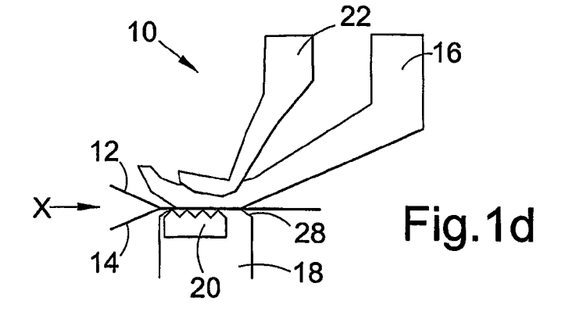

Turning now to FIG. 1c, the moving foot 22 has been retracted and is now spaced apart from the sheet material 12, 14 on the surface 28 of the ultrasonic horn 18. Simultaneously the feed dog 20 has moved downwardly with respect to the ultrasonic horn and returned to the left hand side of the ultrasonic horn 18 as shown in FIG. 1c. At the same time as the moving foot 22 is being retracted the welding foot 16 has come into contact with the sheet material on the surface 28 of the ultrasonic horn 18 so as to nip the material 12, 14 and by virtue of the ultrasonic energy being transferred into the sheet material causing the sheet material to be bonded and fused together. (This is shown also on the front view shown in FIG. 3 wherein the welding foot and ultrasonic horn are in contact with each other and the feed dogs are spaced apart from the two moving feet). From the position shown in FIG. 1d the welding foot 16 is retracted and spaced apart from the ultrasonic horn 18 and returns to the position shown in FIG. 1a. Simultaneously the feed dog 20 returns to the surface 28 of the ultrasonic horn and re-engages the underside of the next portion of the two sheet materials to be bonded and fused together, as in FIG. 1a.

In essence therefore the sequence of steps comprises a feed cycle feeding the sheet material onto the ultrasonic horn followed by a bonding operation, followed by a feed operation, followed by a bonding operation and so on. Accordingly there is provided a sequence of individual or discreet weld or fusion points where the two materials have been bonded together. This sequence of discreet welds or fusion points may be discontinuous or continuous (overlapping).

Figure 2:
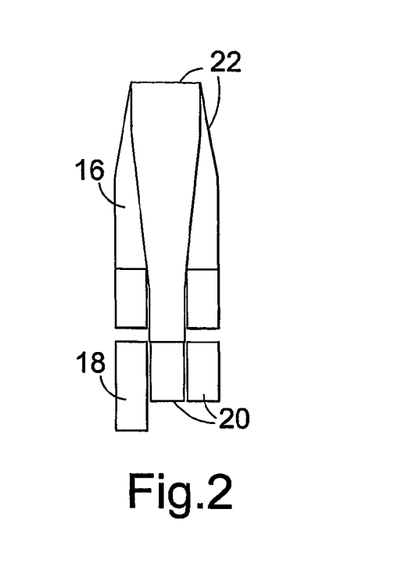
Figure 3:
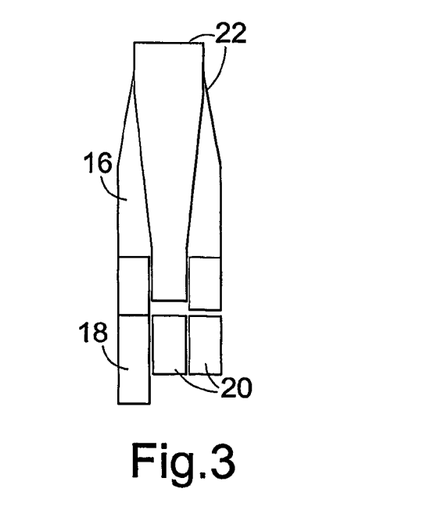

In practice it is desirable that there is provided two feed dogs in a side by side relationship together with two moving feet, again in a side by side relationship as shown in FIGS. 2 and 3. For the avoidance of doubt the moving foot and feed dog arrangement shown with reference to FIGS. 1a to d show only a single moving foot and single feed dog.

Various modifications may be made to the above described embodiment without parting from the scope of the present invention. Thus there may be provided different configurations of seaming apparatus utilising either ultrasonic energy or laser radiation, where the laser or ultrasonic device is provided above or below the flexible sheet materials being joined and to the left or right of the drive means.

Figure 4A:
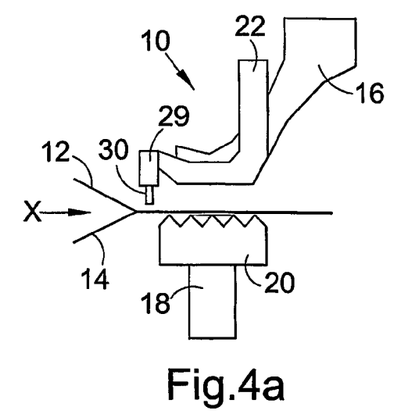
FIGS. 4 to 6 show various examples of alternative embodiments of the seaming apparatus of the invention.

FIG. 4A shows an embodiment where bonding is by means of an ultrasonic horn 18 and a pin portion 29 is mounted on the front of the moving foot 22 and is offset so as to be positioned in front of the welding foot 16, when considered from the direction of feed (indicated by the arrow X). In use, the pin 30 of the pin portion 29 pinches the materials 12, 14 being bonded when they are not engaged by the moving foot 22, allowing them to be pivoted about the pin 30 to produce the desired seam shape. The pin 30 is retractable into the pin portion 29 so as not to interfere with the engagement of the moving foot 22 and the feed dog 20 when they are driving sheet material through the apparatus.

Figure 4B:
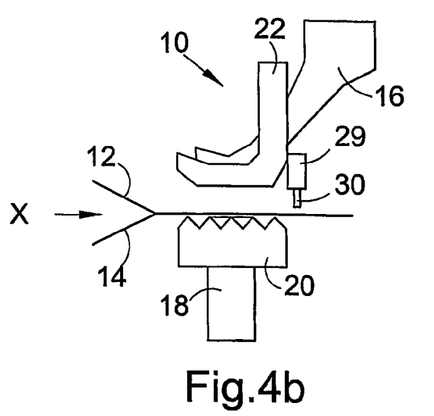

FIG. 4B shows a similar embodiment to that of FIG. 4A except that the pin portion 29 is mounted on the rear of the moving foot 22 and is offset so as to be positioned to the rear of the welding foot 16 when considered from the direction of feed (indicated by the arrow X).

Figure 5A:
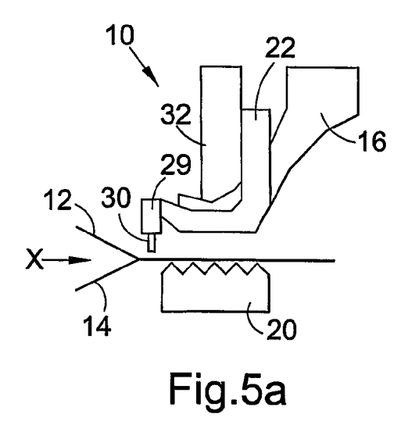
Figure 5B:
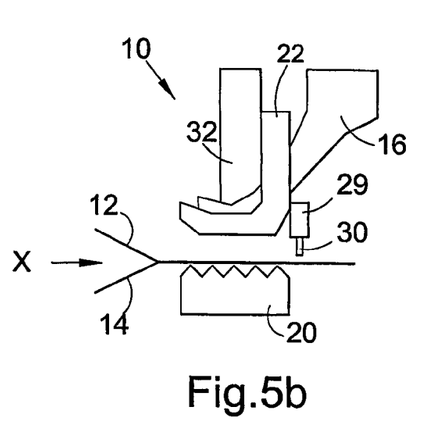

FIG. 5 shows two embodiments where bonding is by means of a laser 32. The pin portion 29 is again mounted on the moving foot 22 and is positioned either in front (FIG. 5A) or behind (FIG. 5B) the welding foot 16.

Figure 6A:
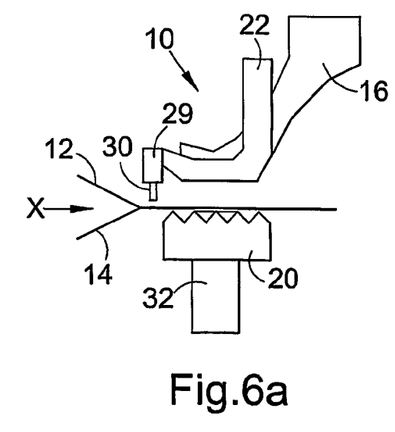
Figure 6B:
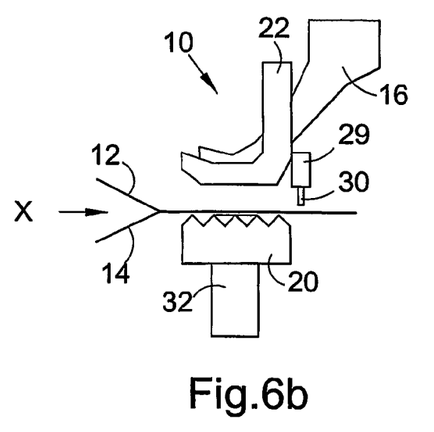
Figure 7A:
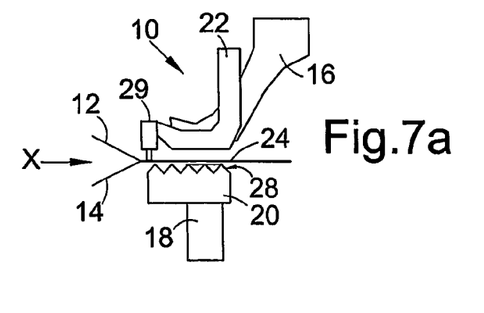
FIGS. 7 to 18 each illustrate a cycle of feeding sheet materials through various embodiments of seaming apparatus according to the invention.
Figure 7B:
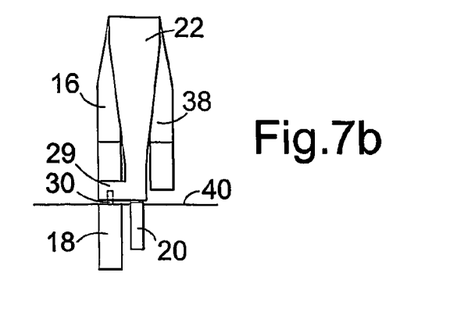
Figure 7C:
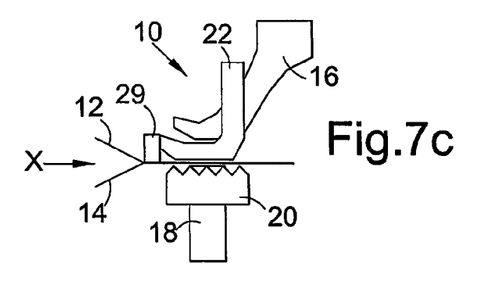
Figure 7D:
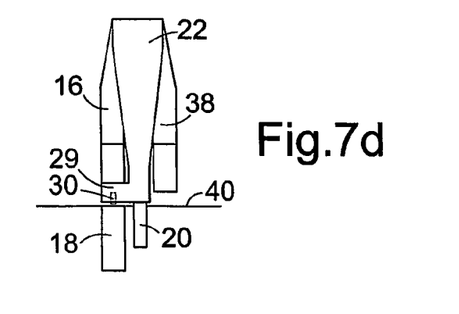
Figure 7E:
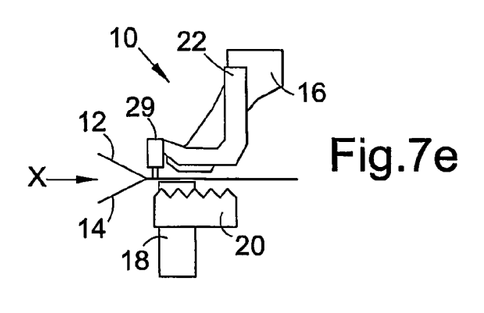
Figure 7F:
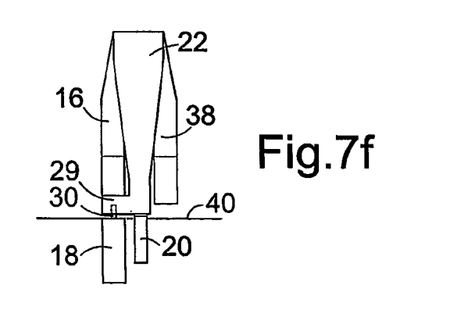
Figure 7G:
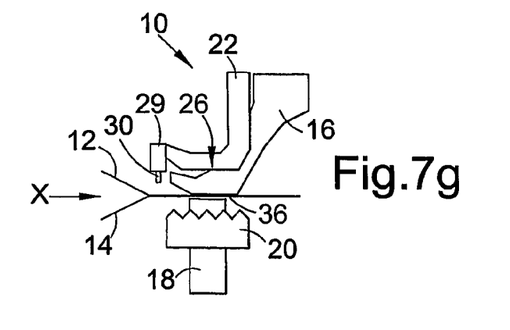
Figure 7H:
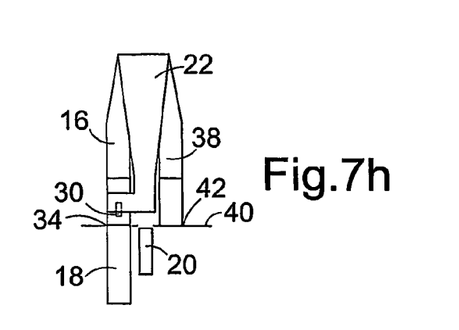
Figure 8A:
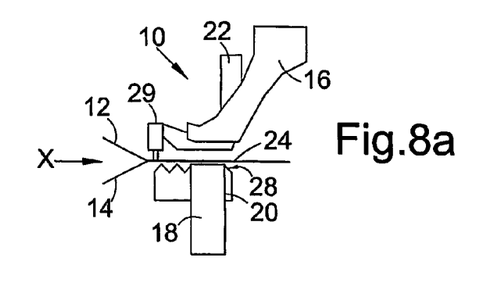
Figure 8B:
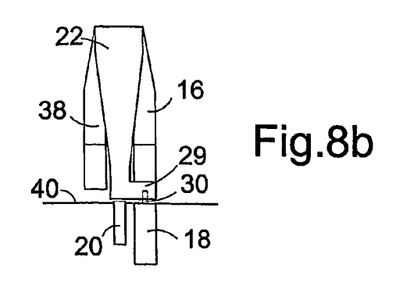
Figure 8C:
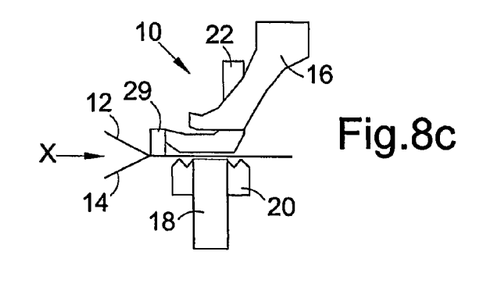
Figure 8D:
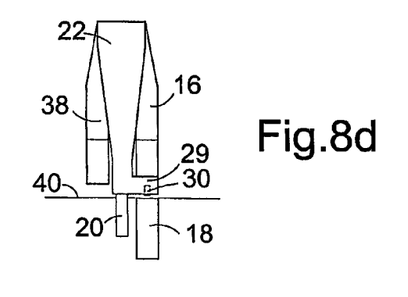
Figure 8E:
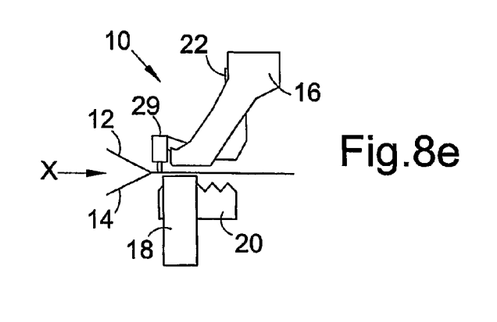
Figure 8F:
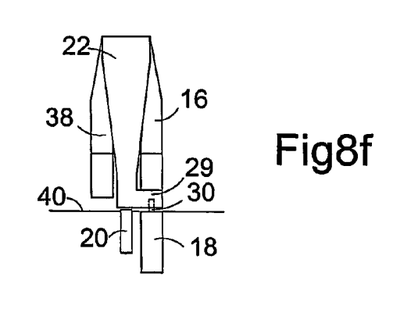
Figure 8G:
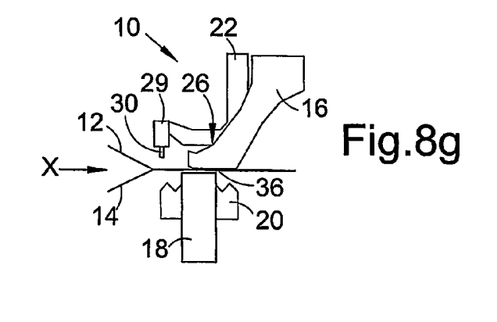
Figure 8H:
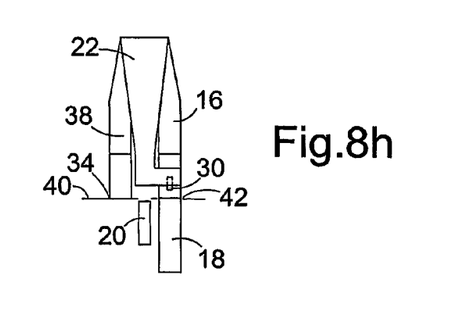
Figure 9A:
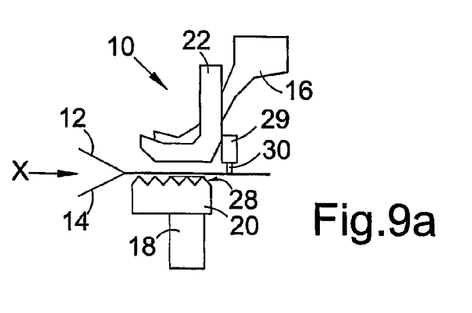
Figure 9B:
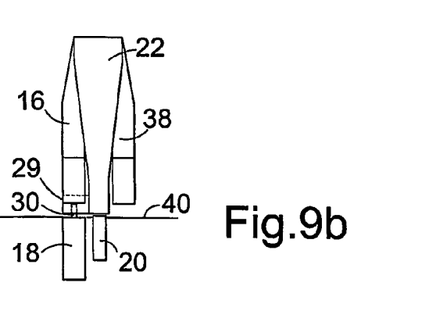
Figure 9C:
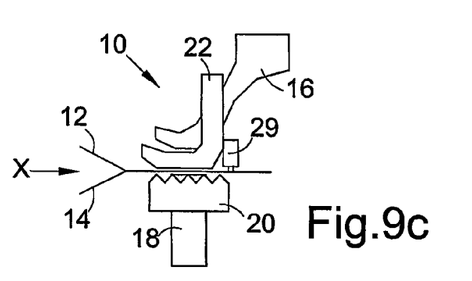
Figure 9D:
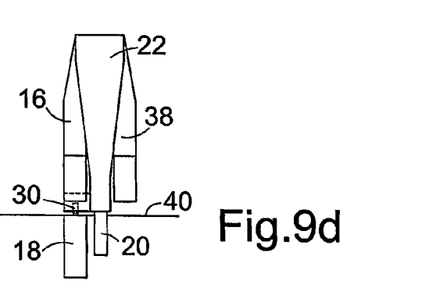
Figure 9E:
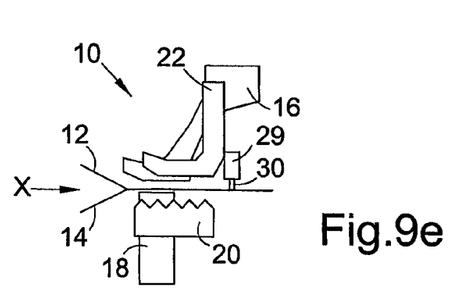
Figure 9F:
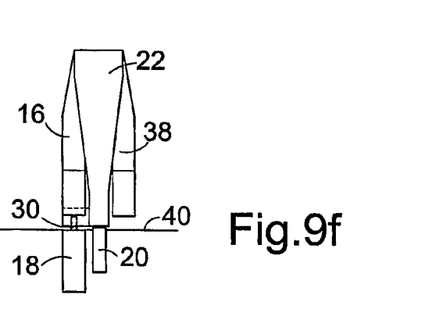
Figure 9G:
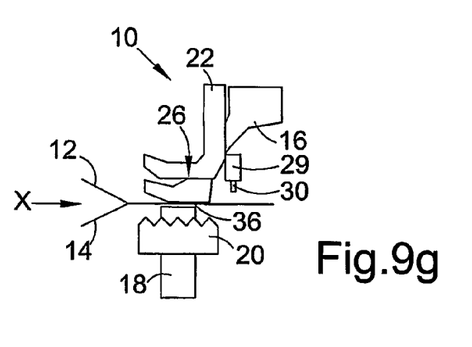
Figure 9H:
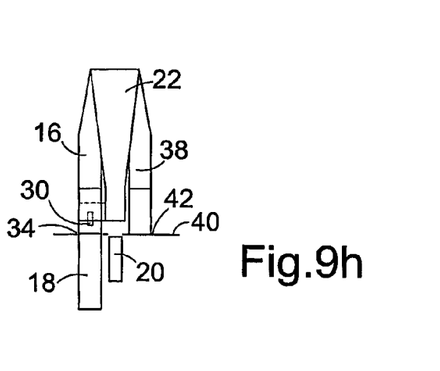
Figure 10A:
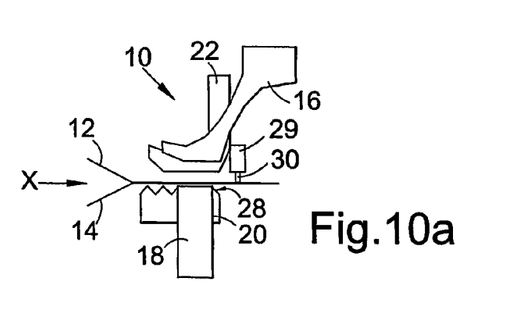
Figure 10B:
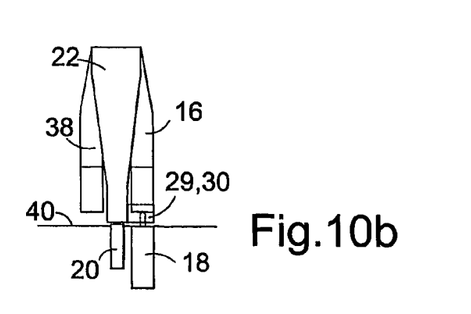
Figure 10C:
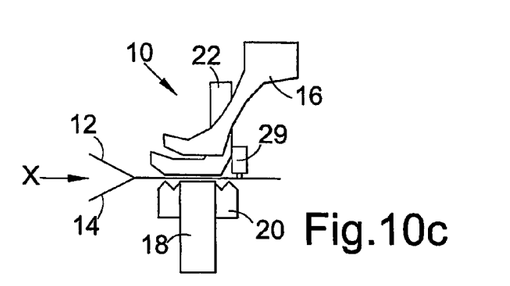
Figure 10D:
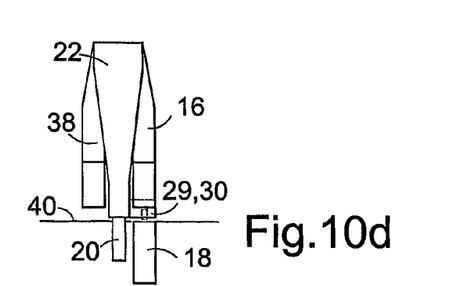
Figure 10E:
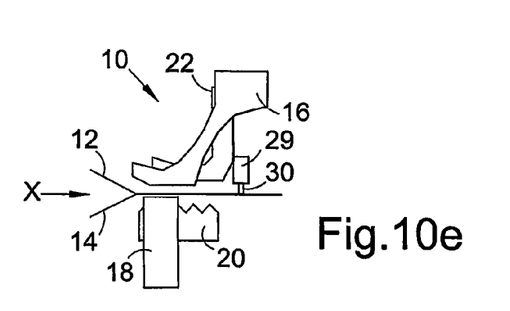
Figure 10F:
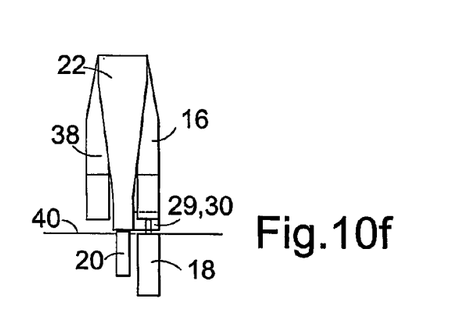
Figure 10G:
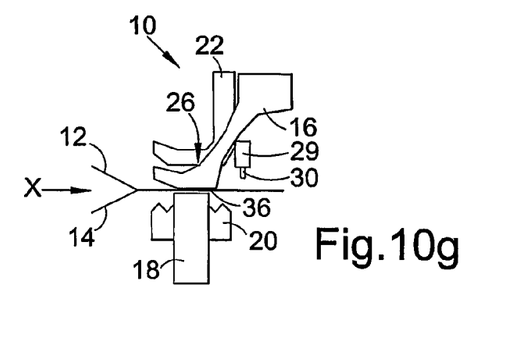
Figure 10H:
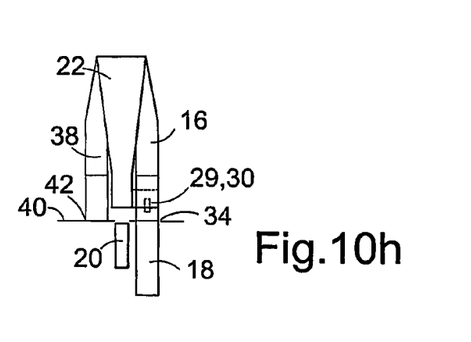
Figure 11A:
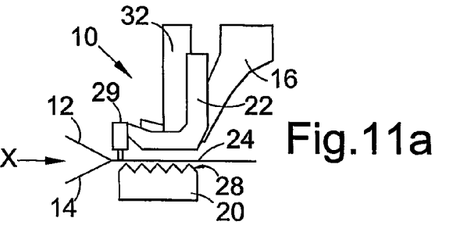
Figure 11B:
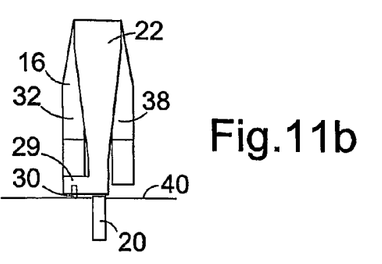
Figure 11C:
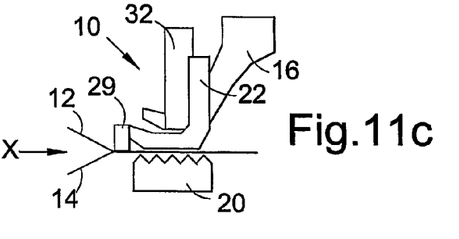
Figure 11D:
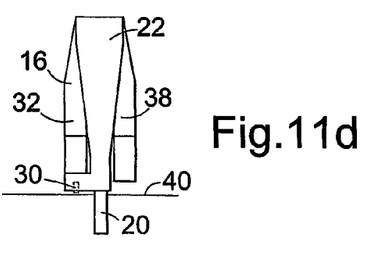
Figure 11E:
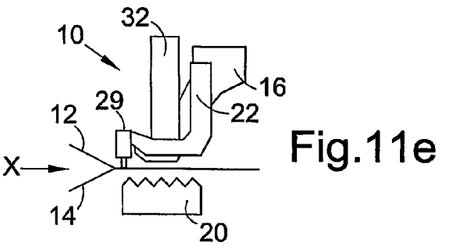
Figure 11F:
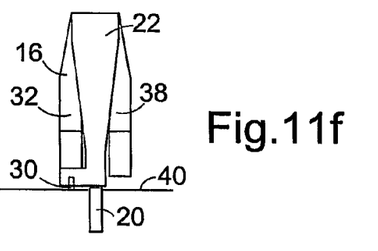
Figure 11G:
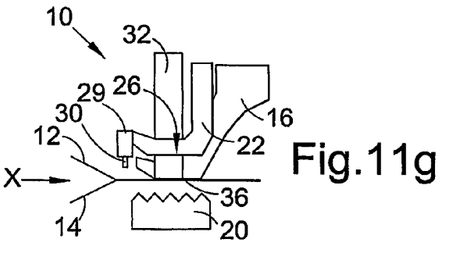
Figure 11H:
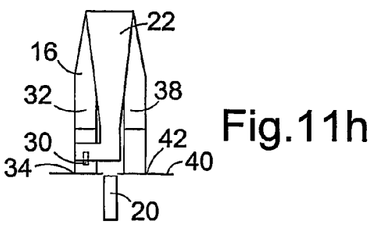
Figure 12A:
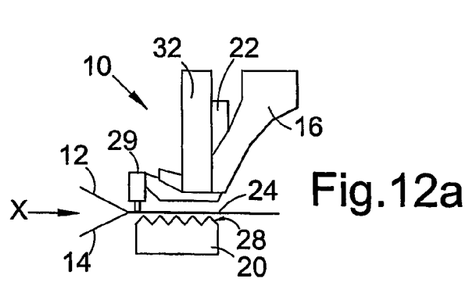
Figure 12B:
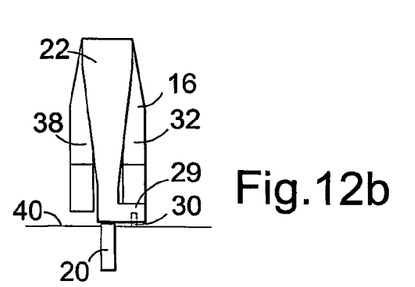
Figure 12C:
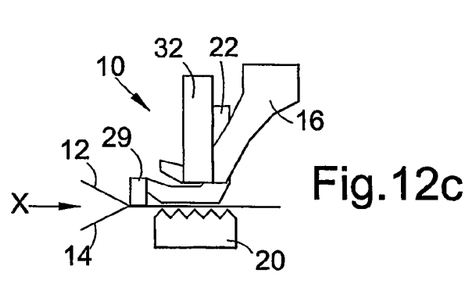
Figure 12D:
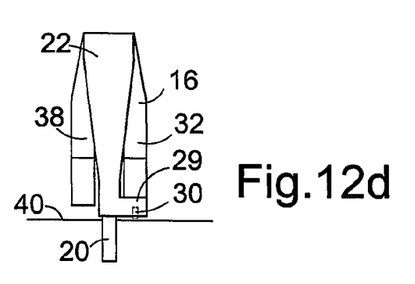
Figure 12E:
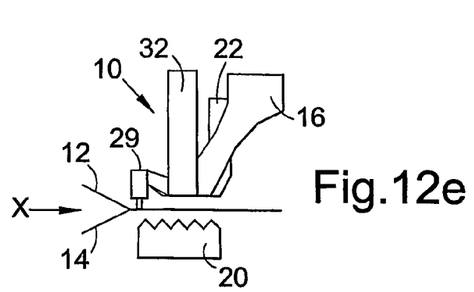
Figure 12F:
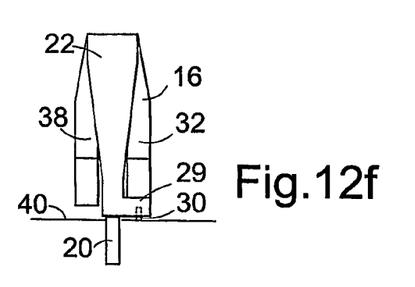
Figure 12G:
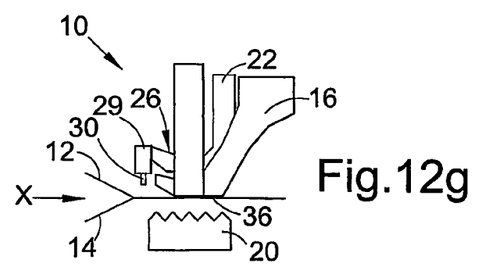
Figure 12H:
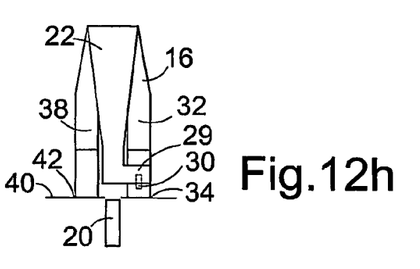
Figure 13A:
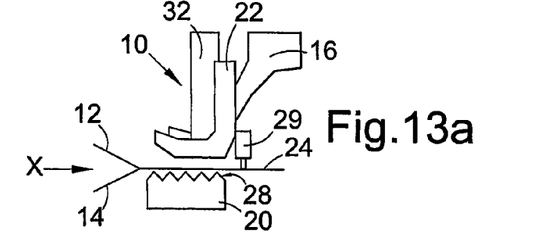
Figure 13B:
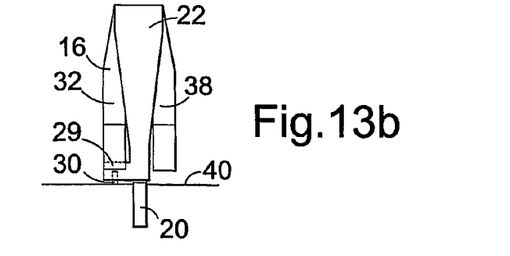
Figure 13C:
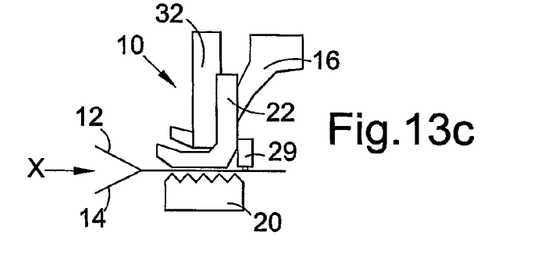
Figure 13D:
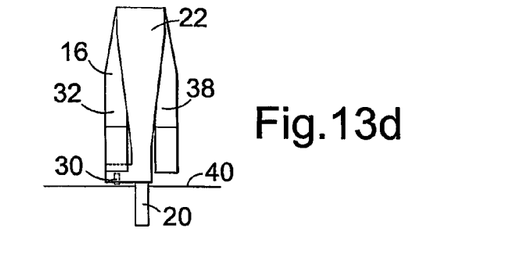
Figure 13E:
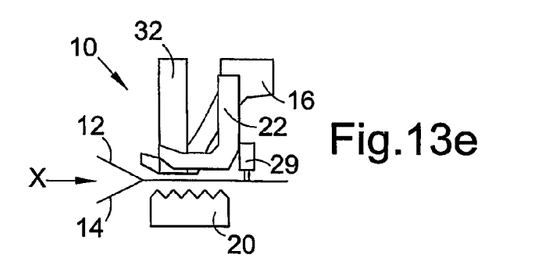
Figure 13F:
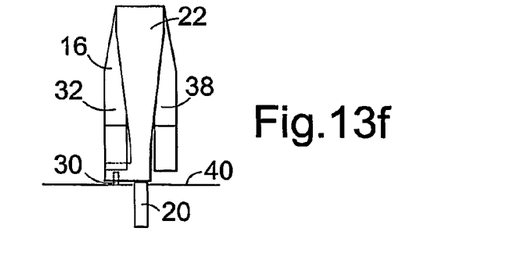
Figure 13G:
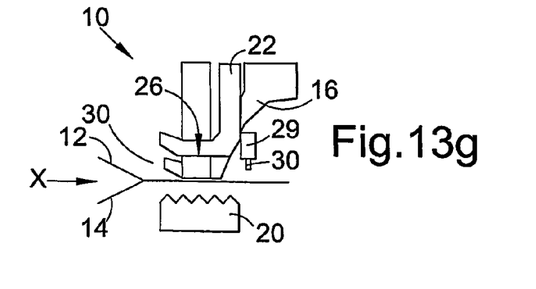
Figure 13H:
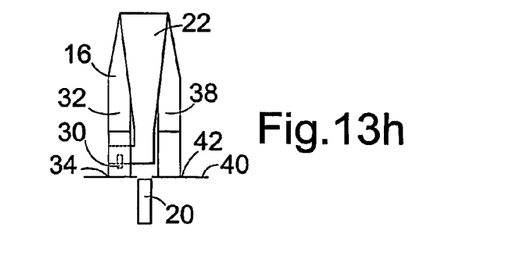
Figure 14A:
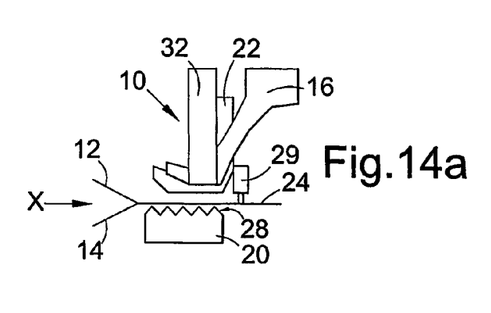
Figure 14B:
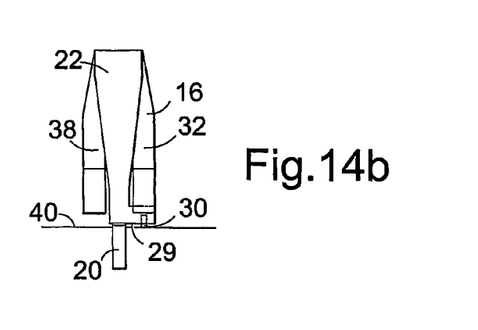
Figure 14C:
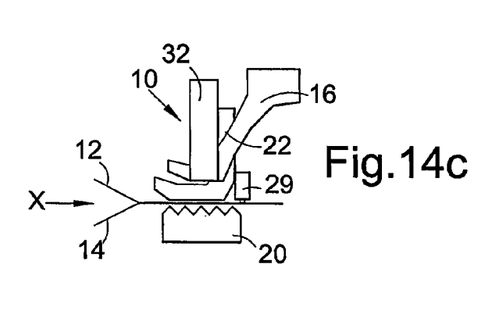
Figure 14D:
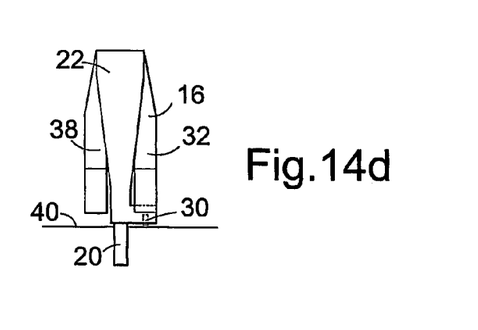
Figure 14E:
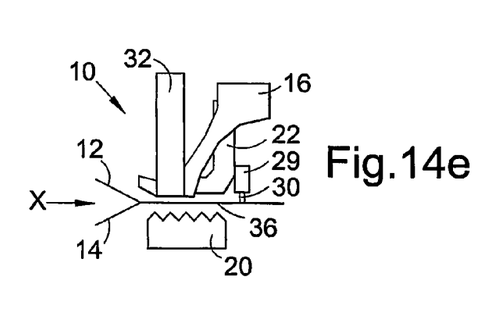
Figure 14F:
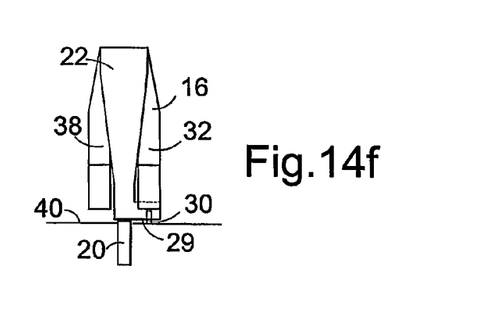
Figure 14G:
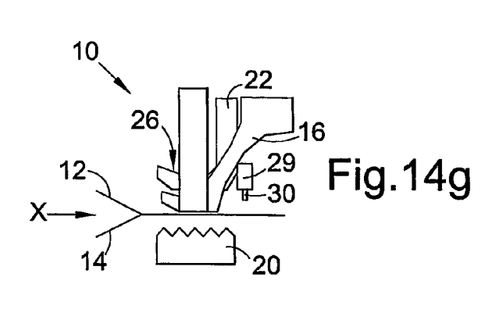
Figure 14H:
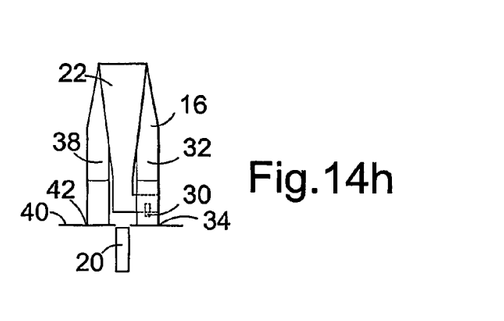
Figure 15A:
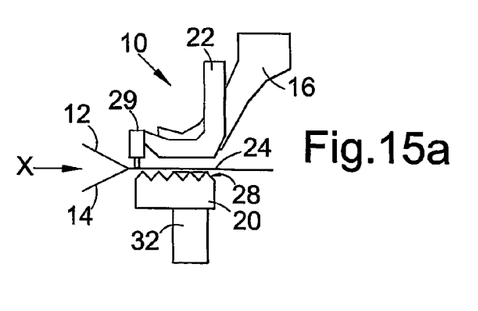
Figure 15B:
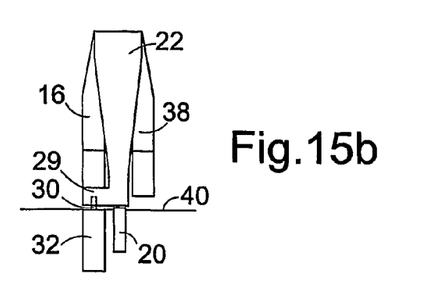
Figure 15C:
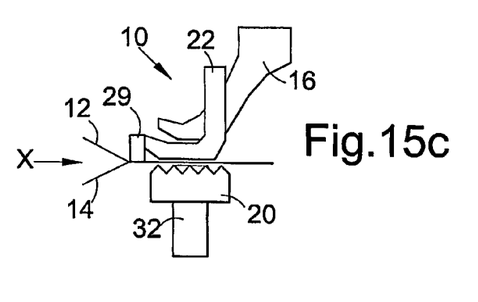
Figure 15D:
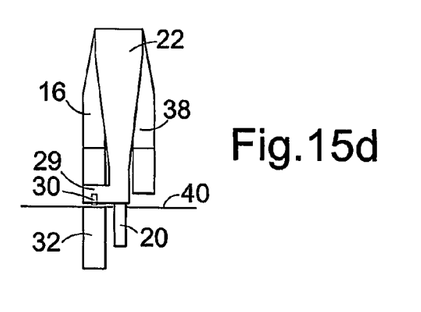
Figure 15E:
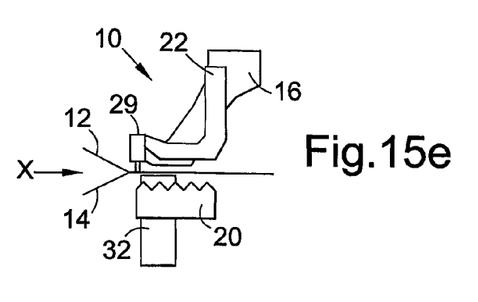
Figure 15F:
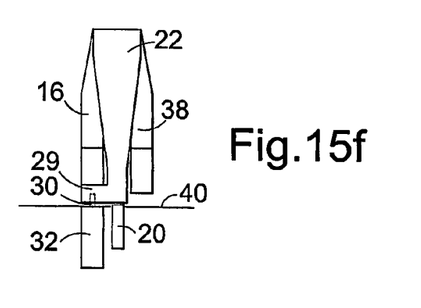
Figure 15G:
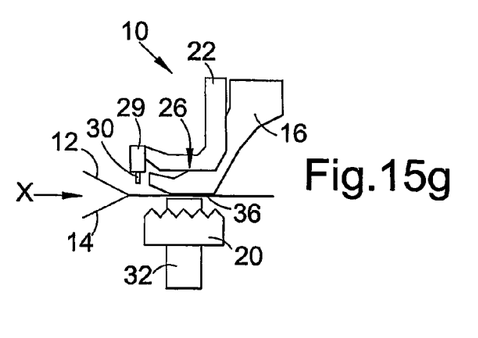
Figure 15H:
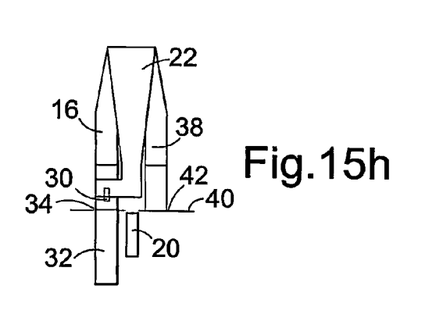
Figure 16A:
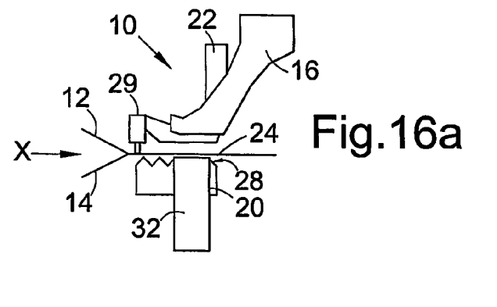
Figure 16B:
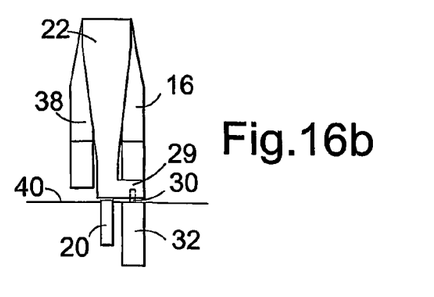
Figure 16C:
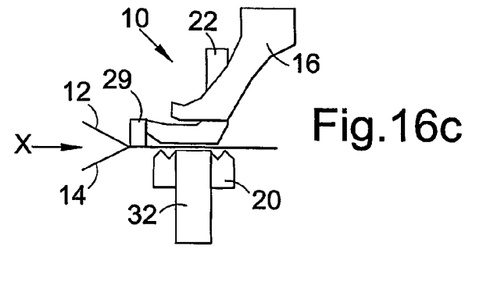
Figure 16D:
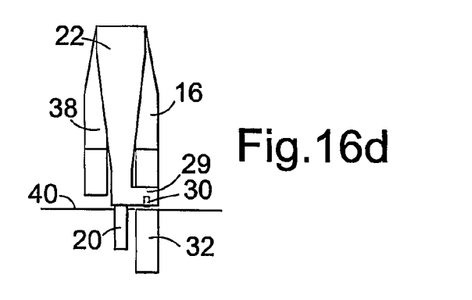
Figure 16E:
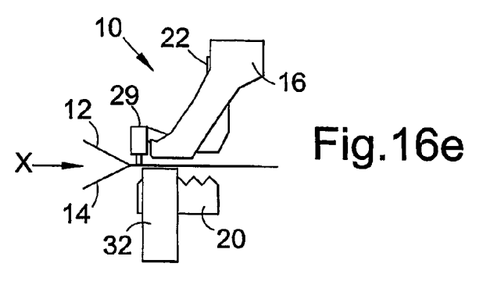
Figure 16F:
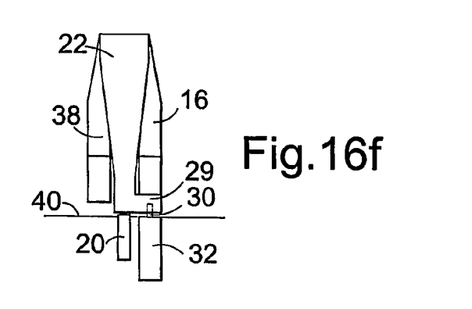
Figure 16G:
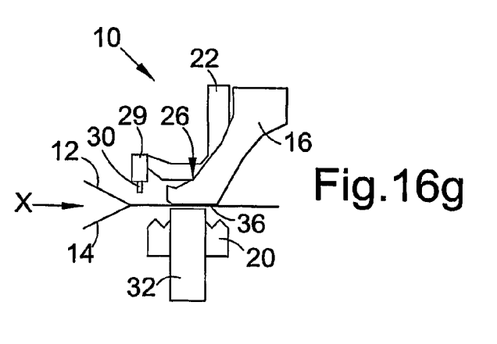
Figure 16H:
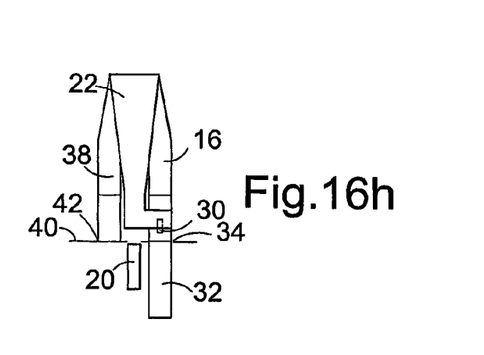
Figure 17A:
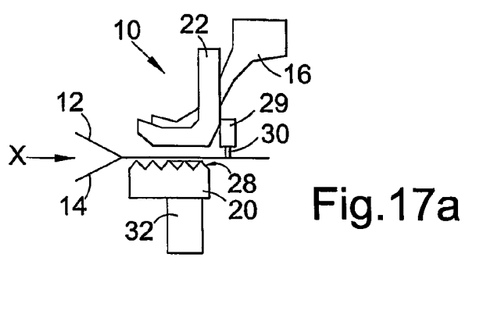
Figure 17B:
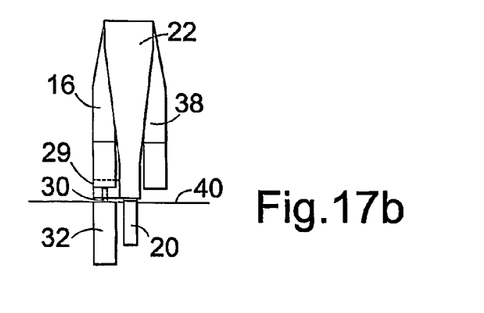
Figure 17C:
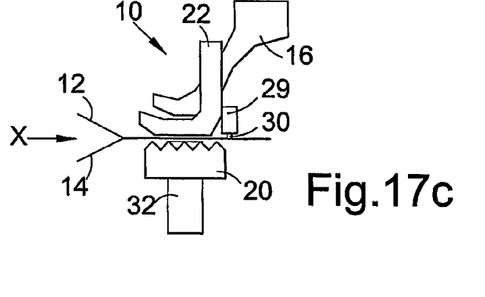
Figure 17D:
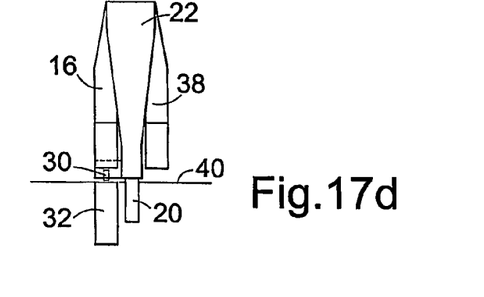
Figure 17E:
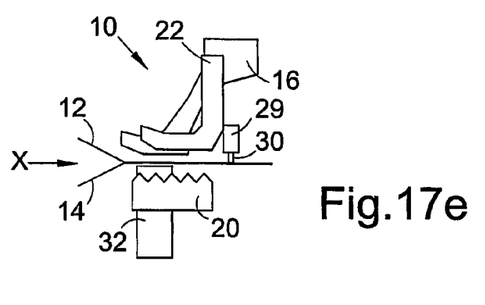
Figure 17F:
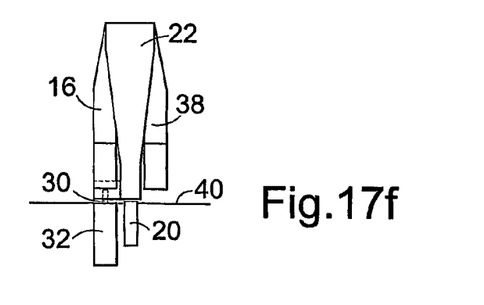
Figure 17G:
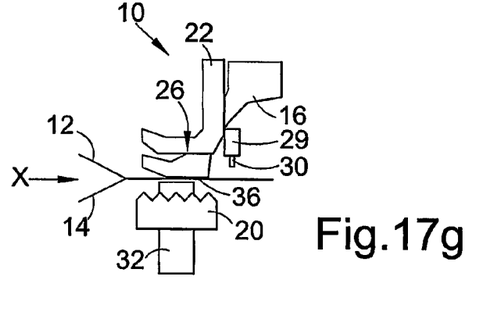
Figure 17H:
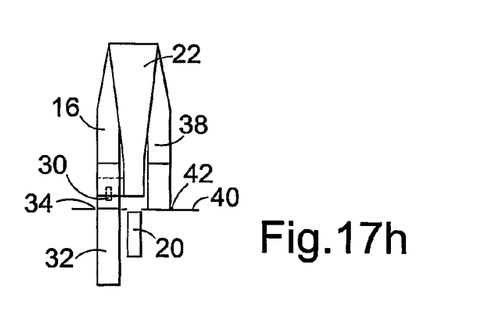
Figure 18A:
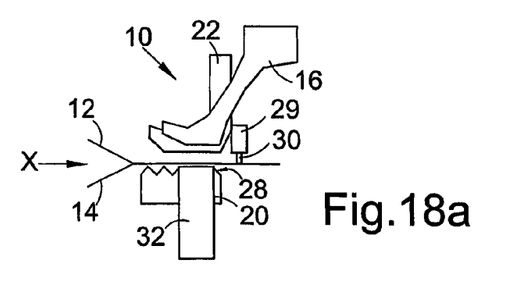
Figure 18B:
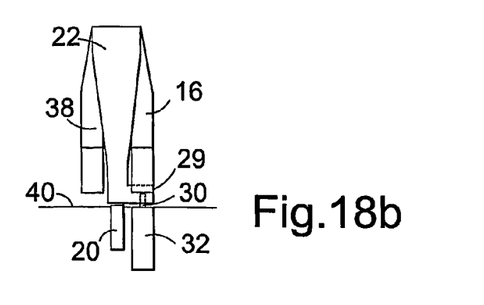
Figure 18C:
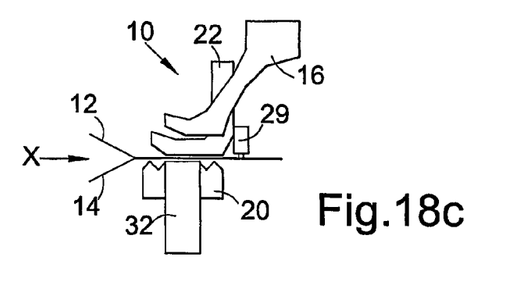
Figure 18D:
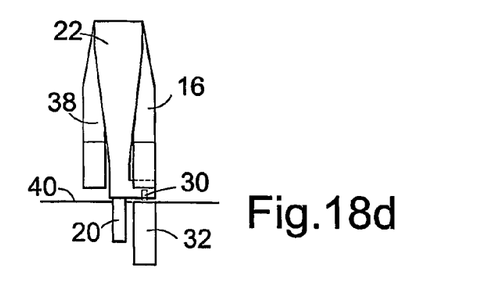
Figure 18E:
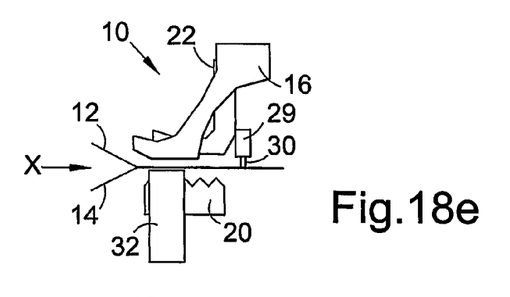
Figure 18F:
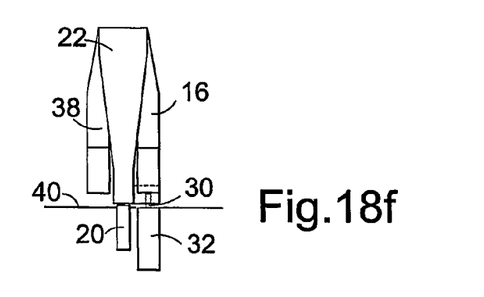
Figure 18G:
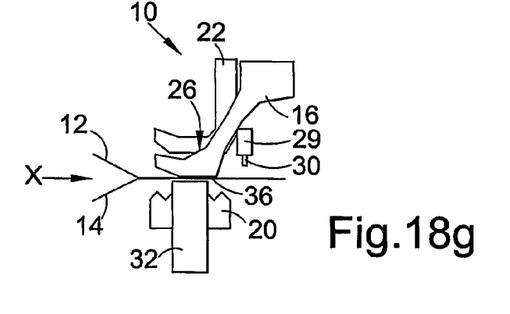
Figure 18H:
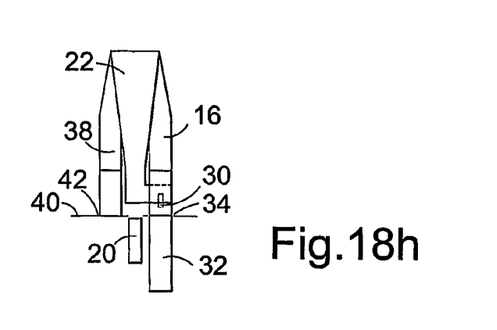

FIG. 6 shows two embodiments where bonding is by means of a laser 32 situated underneath the materials 12, 14 being bonded. Embodiments with a pin portion 29 in front (FIG. 6A) or behind (FIG. 6B) the welding foot 16 are shown.

In FIG. 7 a series of views are shown, representing the cycle of feeding the materials 12, 14 being joined through the seaming apparatus 10 and then making a bond. The embodiment shown has a pin portion 29 in front of the welding foot 16 and bonding is by means of an ultrasonic horn 18. The end elevation and schematic front views, FIGS. 7A and 7B, show the sheet materials 12, 14 engaged by the pin 30 in the pin portion 29 prior to engagement by the moving foot 22 and feed dog 20. The sheet materials 12, 14 can be pivoted about the pin 30 in order to achieve the desired seam shape. FIGS. 7C and 7D show similar views with the moving foot 22 and feed dog 20 engaging the sheet materials to move them through the apparatus 10. In FIGS. 7E and 7F the moving foot 22 has disengaged from the sheet materials 12, 14 and they can again be pivoted about the pin 30 if desired. In FIGS. 7G and 7H the sheet materials are being bonded at a weld point 34 between the ultrasonic horn 18 and the welding foot 16, the sheet material being further secured in the nip 36 by a holding foot 38 (not shown in the end elevation) engaging a throat plate 40 at a hold point 42.

FIGS. 8 to 18 show the same cycle of feeding and bonding using the same views as FIG. 7 but for different embodiments of seaming apparatus 10. As in FIG. 7 the holding foot is not shown in the end elevation for improved clarity.

FIG. 8 A-H shows an apparatus 10 similar to that shown in FIG. 7 except that the bonding assembly, the ultrasonic horn 18 and the welding foot 16, is to the right rather than to the left of the moving foot 22 when viewed from in front. The holding foot 38 is correspondingly moved to the left of the moving foot 22. As in the embodiment shown in FIG. 7 the pin portion 29 is mounted on the moving foot 22 and is formed and arranged so that the pin 30 is positioned in front of the welding foot 16 when viewed from the direction of travel of the sheet materials 12, 14.

FIG. 9 A-H shows an embodiment of the seaming apparatus 10 similar to that shown in FIG. 7 except that the pin portion 29 is to the rear of the welding foot 16.

FIG. 10 A-H shows an embodiment of the seaming apparatus 10 similar to that shown in FIG. 8 except that the pin portion 29 is to the rear of the welding foot 16.

FIG. 11 A-H shows the feeding and bonding cycle for an embodiment of the apparatus 10 wherein the bonding assembly is a laser 32 mounted in the welding foot 16 above the sheet materials 12, 14 to be bonded and to the left of the moving foot 16. FIGS. 11G and 11H show bonding being performed on the sheet materials 12, 14 at the weld point 34. As in FIG. 7 the pin portion 29 is mounted on the front of the moving foot 22 so as to be positioned in front of the welding foot 16, carrying the laser 32.

FIG. 12 A-H shows a similar arrangement to that shown in FIG. 11, except that the laser 32, mounted on the welding foot 16, is positioned to the right of the moving foot 22 when viewed from in front.

FIG. 13 A-H shows an embodiment similar to that shown in FIG. 11 except that the pin portion 29 is to the rear of the laser 32 mounted on the welding foot 16.

FIG. 14 A-H shows an embodiment similar to that shown in FIG. 12 except that the pin portion 29 is to the rear of the laser 32 mounted on the welding foot 16.

In FIG. 15 A-H the feeding and bonding cycle is illustrated for an embodiment using laser bonding, where the laser 32 is sited under the sheet materials 12, 14 and to the left of the feed dog 20. Bonding is made at a weld point 34 as shown in FIGS. 15G and 15H between the laser 32 and the welding foot 16.

FIG. 16 A-H shows an embodiment similar to that shown in FIG. 15 except that the laser 32 is positioned to the right of the feed dog 20.

FIG. 17 A-H shows an embodiment similar to that shown in FIG. 15 except that the pin portion 29 is positioned to the rear of the welding foot 16.

FIG. 18 A-H shows an embodiment similar to that shown in FIG. 16 except that the pin portion 29 is positioned to the rear of the welding foot 16.

The invention claimed is:

1. A seaming apparatus (10) for joining, along a seam without thread, at least two superposed flexible sheet materials (12, 14), said seaming apparatus comprising bonding means (16,18) for bonding together at least two flexible sheet materials, said bonding means having a nip portion (36) for releasably engaging together sheet material in use of the apparatus; and drive means (20,22) formed and arranged for engaging sheet material, in use and to be bonded, and moving incrementally sheet material through said bonding means, said drive means being formed and arranged to co-operate with said nip portion so as to sequentially nip then drive material through the apparatus with only one of said nip portion and said drive means in contact with sheet material, in use of the apparatus, at any given moment, characterized in that the apparatus comprises a pin portion (29) formed and arranged to hold in said apparatus, flexible sheet material (12,14), in use of the apparatus, at a time when it is not engaged by either the drive means (20,22) or the bonding means (16,18), enabling flexible sheet material in use of the apparatus to be pivoted there around for easy maneuvering of a seam shape.

2. An apparatus (10) according to claim 1 wherein the bonding means comprises an ultrasonic horn (18) and a welding foot (16), said horn (18) and said welding foot acting as said nip portion (36).

3. An apparatus (10) according to claim 1 wherein the bonding means comprises a laser (32).

4. An apparatus (10) according to claim 1 wherein the drive means comprises at least one feed dog (20) formed and arranged for co-operation with at least one moving foot (22) between which flexible sheet materials (12, 14) are engaged, in use of the apparatus, said at least one feed dog (20) being formed and arranged to incrementally move flexible sheet materials through the bonding means (16, 18).

5. An apparatus (10) according to claim 1 wherein said drive means (20,22) is adjustable so as to vary, in use of the apparatus, the feed rate of the flexible sheet material (12,14) through the seaming apparatus.

6. An apparatus (10) according to claim 1 wherein the nip portion (36) has contact faces that are shaped so as to impart a patterned appearance to materials being joined (12,14) in use of the apparatus.

7. An apparatus (10) according to claim 1 wherein the nip portion (36) further comprises a holding foot (38) and a throat plate (40), said holding foot and said throat plate being formed and arranged for releasably engaging sheet material in use of the apparatus.

8. A seaming apparatus as claimed in claim 1 wherein the pin portion is attached to a moving foot of the drive means.

9. A seaming apparatus as claimed in claim 1 wherein the pin of the pin portion is pointed.

10. A seaming apparatus as claimed in claim 1 wherein the contact surface at the tip of the pin is a flat disc.

11. A seaming apparatus as claimed in claim 1 wherein the contact surface at the tip of the pin is a hemisphere.

12. A method for joining, along a seam without thread, at least two superposed flexible sheet materials (12, 14) comprising the steps of;
   a) providing a seaming apparatus (10) according to claim 1;
   b) introducing said at least two flexible sheet materials (12,14) into said seaming apparatus (10) so that the flexible sheet materials are sequentially, nipped by the nip portion (36) of the apparatus whilst being bonded by the bonding means (16,18), then driven incrementally through the apparatus by the drive means (20, 22), with only one of said nip portion (36) and said drive means (20, 22) being in contact with the sheet material at any given moment; and
   c) maneuvering a seam shape when said pin portion is holding said flexible sheet material, at an instance when it is not engaged by other said drive means or the bonding means.

\* \* \* \* \*